United States Patent Office  3,759,880
Patented Sept. 18, 1973 }

3,759,880
MANUFACTURE OF INSOLUBLE AND ONLY SLIGHTLY SWELLABLE POLY - N - VINYL-PYRROLIDONE-2
Ernst Hoffmann and Karl Herrle, Ludwigshafen, Germany, assignors to Badische Anilin- & Soda-Fabrik Aktiengesellschaft, Ludwigshafen (Rhine), Germany
No Drawing. Filed Nov. 30, 1971, Ser. No. 203,436
Int. Cl. C08f 1/66
U.S. Cl. 260—80.3 R     4 Claims

ABSTRACT OF THE DISCLOSURE

Manufacture of poly-N-vinylpyrrolidone-2 by polymerization of vinyl pyrrolidone in the presence of unsaturated cyclic acid amides and an oxidizable metal.

This invention relates to the manufacture of insoluble and only slightly swellable poly-N-vinylpyrrolidone-2.

It is well known that the homopolymers of N-vinylpyrrolidone-2 are generally slightly soluble in water and in numerous organic solvents. It is also known that insoluble copolymers of N-vinylpyrrolidone-2 which are variably swellable may be prepared by copolymerizing N-vinylpyrrolidone-2 in conventional manner with difunctional vinyl or acrylic compounds acting as cross-linking agents, for example divinyl esters of dicarboxylic acids such as succinic acid and adipic acid, diacrylates of polyhydric alcohols such as ethylene glycol and butanediol-1,4, and vinyl acrylate and N,N'-divinylethylene urea. However, even when large amounts of difunctional component are used, it is not possible to prepare polymers which are only slightly swellable in water.

The swellability of such polymers may be determined by stirring a weighed quantity of the polymer in excess water, allowing the mixture to stand for 24 hours, filtering and weighing the gelatinous filter cake. The swelling factor $f$ is then calculated from the following formula:

$$f = \frac{\text{weight of filter cake}}{\text{weight of original sample}}$$

For example, the following swelling factors have been determined:

Proportion of cross-linking agent
in polymer of N-vinylpyrrolidone-2:    Swelling factor
    10% of divinyl adipate _____ 6.7
    15% of dinvyl adipate _____ 6.5
    20% of divinyl adipate _____ 6.2
    10% of butanediol-1,4-diacrylate _____ 18
    5% of vinyl acrylate _____ 15
    10% of vinyl acrylate _____ 8
    10% of N,N'-divinylethylene urea _____ 9

Moreover, in the preparation of such polymer large quantities of soluble, i.e. uncross-linked fractions are obtained.

U.S. Pat. 2,938,017 reveals that insoluble polymerization products are obtained by heating N-vinylpyrrolidone-2 alone, without the addition of water but in the presence of basic alkali or alkaline earth metal compounds such as the oxides, hydroxides or alkoxides of sodium or potassium, at a pressure of 100 mm. of Hg, heating being carried out at 150° C., during which operation the temperature of the reaction mass rises to 200° C. This method does indeed produce only slightly swellable polymers, but they always show strong discoloration due to the high temperature at which polymerization takes place. Moreover, the reaction is very difficult to control under these conditions.

Finally, U.S. Pats. 3,277,066 and 3,306,886 disclose processes for the manufacture of insoluble poly-N-vinylpyrrolidone-2 in which N-vinylpyrrolidone-2 is placed in an autoclave and heated under pressure at about 140° C. in the presence of water and catalysts such as alkali metal hydrides, alkali metal borohydrides and/or alkali or alkaline earth metal hydroxides or alkoxides until the polymerization reaction has started, whereupon the contents of the autoclave are cooled to about 80° C. and then held at from 80° to 100° until the reaction is complete.

These processes also produce sparingly swellable polymers but they have the disadvantage that elevated temperatures are required to start the polymerization reaction, which necessitates the use of pressure vessels when water is included. Another drawback is that the induction times are long and vary in length and are followed by a vigorous reaction which tends to produce discolored polymers.

Both of the above references teach the use of the resulting polyvinylpyrrolidone as a clarifying agent for vegetable drinks. A drawback of the processes in question is that strongly alkaline materials must be used in the preparation of the products and this means that alkaline residues may remain in the polymers, which is no inconsiderable deterrent to the use of these products in the light of the strict foodstuff laws now in force in most countries of the world.

It is an object of the invention to provide a new method of producing insoluble polyvinylpyrrolidone.

It is a further object to provide a method of manufacture which involves mild reaction conditions and thus substantially avoids decomposition products, and which makes no use of basic agents and thus provides products which are completely indifferent in aqueous solutions and thus involve no health hazards.

It is yet another object of the invention to provide a polyvinylpyrrolidone which is eminently suitable for use as a clarifying agent for drinks on account of the above advantages.

These and other objects and advantages are achieved in a process for the manufacture of insoluble and only slightly swellable poly-N-vinylpyrrolidone-2 by polymerization of monomeric N-vinylpyrrolidone-2 in aqueous solution, wherein the polymerization of the monomeric N-vinylpyrrolidone is carried out in the presence of from 0.5 to 10% by weight, based on monomeric N-vinylpyrrolidone, of a cyclic acid amide containing at least two ethylenically unsaturated groups, of which at least one is attached to an amide nitrogen atom, and the reaction is started at the surface of metals which are capable of forming a permeable oxide film.

The starting material for the process of the invention is a commercial pure vinylpyrrolidone-2.

Suitable cyclic acid amides containing two ethylenically unsaturated groups are compounds in which at least one vinyl group is attached to an amide nitrogen atom. Examples of such compounds are N,N'-divinylimidazolidone-2 (N,N-divinylethylene urea), N,N'-divinylhexahydropyrimidinone-2 (N,N'-divinylpropylene urea), and N-vinyl-3-ethylidenepyrrolidone-2. The amount of said difunctional compound to be used may vary from 0.5 to 10% by weight, based on the N-vinylpyrrolidone-2 used. We prefer to use from 1 to 3% by weight.

Polymerization is effected in aqueous solution. The water used may be distilled water or fully demineralized water. The amount of water may vary within wide limits, it being convenient to use from 25 to 100% by weight, based on the N-vinylpyrrolidone used. The presence of water is necessary for the formation of the initial polymer seeds and also, during the reaction, for the removal of the heat of reaction at the boiling point of the reaction mixture, by which means the reaction is prevented from becoming uncontrollable. The metal required to start the reaction and thus to assist the formation of polymer seeds must be susceptible to attack by oxygen and must be able to form a permeable oxide film. Examples of such metals are iron or oxidizable iron alloys, cobalt, zinc and tin. They may be used as bare metal or be already coated with an oxide film. The metal may be used for example in the form of powder, turnings, packing, strips of sheeting or the like. When carrying out the polymerization on a commercial scale, it is convenient to use apparatus which is at least partly made of the said metals. Small quantities of metal compounds become incorporated in the product but these may be readily removed with solution of, say, complexing agents. Alternatively, the reaction may be initiated using polymer seeds which have been previously formed with the aid of one of the said metals as initiator, so that it is no longer necessary for metal to be present in the main reaction.

In addition, polymerization may be carried out in the presence of any of the agents, e.g. peroxy compounds such as hydrogen peroxide, dibenzoyl peroxide, t-butyl hydroperoxide and inorganic peroxide compounds such as peroxydisulfate or other compounds which readily dissociate into free radicals, e.g. aliphatic azo compounds such as azodiisobutyronitrile.

Specifically, the reaction is carried out as follows: Commercially pure monomeric vinylpyrrolidone is placed in water. In order that the reaction may take place in contact with one of the metal surfaces defined above, it may be carried out in an iron vessel. Alternatively, packing or the aforementioned turnings or strips of sheeting of one of the said metals may be added to the monomer solution. The said acid amide compound is then added in the proportions specified. By adding traces of peroxides or other free radical activators as described above, it is possible to effect a considerable reduction of the induction time, which has a duration of several hours when not reduced in this manner. During the induction time, the formation of white insoluble polymer seeds is seen to take place on the surface of the metal or alloy, which polymer seeds rapidly grow accompanied by a rise in temperature to the boiling point and an increase in volume until the entire reaction mixture has reacted. While the reaction takes place and is not yet complete, polymer may be removed from the reaction mixture and immediately used as seed for further polymerization batches. Such active seed continues to grow in the aforementioned monomer solution in the absence of metals and without the addition of a free radical activator.

The advantages of the process of the invention over the processes described in U.S. Pats. 2,938,017; 3,277,066 and 3,306,886 reside in the careful treatment of the product achieved thereby and in the fact that the addition of strong alkalis and the use of temperatures above 110° C. are avoided, resulting in the production of very pure and completely white polymers.

Unlike the processes described in said U.S. patents, the process of the invention may be carried out at atmospheric pressure, thus obviating the necessity for pressure vessels. Moreover, the polymerization is nearly quantitative.

The polymers produced by the process of the invention are virtually insoluble in water, acids, bases and the usual organic solvents. They are only sparingly swellable in water. Their swelling factor is from 3.5 to 5. They are distinctly superior in purity and swelling factor to the copolymers of N-vinylpyrrolidone with difunctional acrylic and vinyl compounds as prepared by conventional processes.

Insoluble and only slightly swellable polymers of N-vinylpyrrolidone-2 are valuable adsorbents for many purposes, especially for clarifying vegetable drinks such as beer, wine and fruit juices.

In the following examples the parts are by weight unless otherwise stated. The parts by weight relate to the parts by volume as do kilograms to liters.

EXAMPLE 1

In a vessel having a capacity of 500 parts by volume and equipped with thermometer and reflux condenser, there is placed a mixture of 100 parts of N-vinylpyrrolidone, 100 parts of distilled water and 1 part of N,N'-divinylimidazolidone-2 and one bare-metal iron packing element (Pall ring 15 x 15 mm.) and about 0.005% of dibenzoyl peroxide (based on N-vinylpyrrolidone) are added and the mixture is heated to 35° C. After approximately 90 minutes small white polymer seeds are seen on the surface of the packing element and these seeds grow visibly and the growing mass soon projects above the level of the liquid and finally fills the entire volume of the vessel. During polymerization, the reaction mass heats up to its boiling point of 102° C. Vaporized water is condensed in the reflux condenser and flows back into the vessel.

The period between the appearance of the first polymer seed and the point at which the entire volume of the vessel is full of white, crumbly polymer mass after consumption of all of the liquid phase is about 15 minutes. Boiling slows down soon afterward and eventually stops altogether.

The product of the reaction is removed from the vessel, washed 3 times with distilled water to remove soluble portions and then dried in a vacuum oven at 80° C. There are obtained 90 parts of a pure white, granular to crumbly polymer which is sparingly swellable in water but completely insoluble in the usual organic solvents such as hydrocarbons, alcohols, ethers, ketones, organic halogen compounds and organic nitrogen compounds. It is non-fusible and decomposes above 300° C.

EXAMPLE 2

Starting charge

A mixture of 25 parts of N-vinylpyrrolidone, 25 parts of distilled water and 0.5 part of N,N'-divinylimidazolidone is placed in a 100 ml. flask and, after the addition of a few baremetal iron turnings and from 0.02 to 0.03 part of dibenzoyl peroxide, is heated to from 30° to 35° C. After approximately 2 hours, the first polymer seeds have formed and these continue to grow, initially slowly and then at a visibly increasing rate, the temperature in the reaction flask rising to 102° C.

Main charge

A mixture of 500 parts of N-vinylpyrrolidone, 500 parts of distilled water and 10 parts of N,N'-divinylimidazolidone is placed in a 2 l. flask equipped with thermometer and reflux condenser and preheated to about 80° C. About 5 parts of polymer containing fresh polymer seed and just previously removed from the starting charge during the main growth period are added. The seed transferred to the main charge is soon seen to commence growth therein and the reaction mass heats up to 102° C. and commence to boil under reflux. After from 15 to 20 minutes, the contents of the flask are fully polymerized to a white loose mass, all of the liquid phase having been consumed.

After the temperature in the flask has fallen to about 60° C., the resulting polymer is worked as described in Example 1. The yield of pure white insoluble poly-N-vinylpyrrolidone is 98% of theory.

EXAMPLE 3

Example 2 was repeated using the same starting charge but using a main charge which was composed of 500 parts of N-vinylpyrrolidone, 500 parts of water and 15 parts of N,N'-divinylimidazolidone. The yield was 100% of theory.

EXAMPLE 4

Example 2 was repeated using the same starting charge but using a main charge which consisted of 500 parts of N-vinylpyrrolidone, 250 parts of water and 10 parts of N,N'-divinylimidazolidone. The maximum temperature in the flask was 105° C. and the yield was 97% of theory.

EXAMPLE 5

Example 2 was repeated using the same starting charge but using a main charge consisting of 500 parts of N-vinylpyrrolidone, 125 parts of water and 5 parts of N,N'-divinylimidazolidone. The maximum temperature in the flask was 106° C. and the yield was 94% of theory.

EXAMPLE 6

Example 2 was repeated except that N,N'-divinylhexahydropyrimidinone-2 was used instead of N,N'-divinylimidazolidone-2. There was obtained a pure white insoluble poly-N-vinylpyrrolidone in a yield of 96% of theory.

EXAMPLE 7

Example 1 was repeated except that 2 parts of N,N-divinylimidazolidone were used instead of 1 part thereof and the iron packing was replaced by a strip of zinc sheeting. There was obtained a pure white poly-N-vinylpyrrolidone in a yield of 91%.

We claim:
1. A process for the manufacture of insoluble and only slightly swellable poly-N-vinylpyrrolidone-2 which comprises: copolymerizing N-vinylpyrrolidone-2 and a comonomer selected from the group consisting of N,N'-divinylimidazolidone, N,N' - divinylhexahydropyrimidinone-2 or N-vinyl-3 - ethylidene-pyrrolidone - 2, the amount of said comonomer being from 0.5 to 10% by weight based on the weight of said N-vinylpyrrolidone-2, said copolymerization taking place in aqueous solution and in the presence of a metallic starting agent selected from the group consisting of metallic iron, oxidizable iron alloys, cobalt or tin, said starting agents being capable of forming a permeable oxide film.

2. A process for the manufacture of insoluble and only slightly swellable poly-N-vinylpyrrolidone-2 which comprises: copolymerizing N-vinylpyrrolidone-2 and a comonomer selected from the group consisting of N,N'-divinylimdazolidone, N,N'-divinylhexahydropyrimidinone-2 or N-vinyl - 3-ethylidene-pyrrolidone-2, the amount of said comonomer being from 0.5 to 10% by weight based on the weight of said N - vinylpyrrolidone - 2, said copolymerization taking place in aqueous solution and in the presence of insoluble poly-N-vinylpyrrolidone copolymer seed which has been formed from N-vinylpyrrolidone in the presence of metallic iron, oxidizable iron alloys, cobalt or tin and N,N'-divinylimidazolidone, N,N'-divinylhexahydropyrimidinone - 2 or N-vinyl - 3-ethylidene-pyrrolidone-2.

3. A process as set forth in claim 1 wherein the amount of said comonomer is from 1 to 3% by weight.

4. A process as set forth in claim 1, wherein the reaction is carried out in aqueous solution, the proportion of water being from 25 to 100% by weight, based on the N-vinylpyrrolidone used.

References Cited
UNITED STATES PATENTS

| | | | |
|---|---|---|---|
| 2,938,017 | 5/1960 | Grosser | 260—88.3 |
| 3,277,066 | 10/1966 | Grosser et al. | 260—88.3 |
| 3,306,886 | 2/1967 | Grosser et al. | 260—88.3 |
| 3,370,041 | 2/1968 | Korniciter et al. | 260—67 |
| 3,394,156 | 7/1968 | Korniciter et al. | 260—429.5 |
| 3,511,823 | 5/1970 | Leibowitz et al. | 260—88.3 |
| 3,532,680 | 10/1970 | Cooper | 260—88.3 |

JOSEPH L. SCHOFER, Primary Examiner

S. M. LEVIN, Assistant Examiner

U.S. Cl. X.R.

260—78.5 UA, 86.1 R

UNITED STATES PATENT OFFICE
CERTIFICATE OF CORRECTION

Patent No. 3,759,880           Dated September 18, 1973

Inventor(s) Ernst Hofmann and Karl Herrle

It is certified that error appears in the above-identified patent and that said Letters Patent are hereby corrected as shown below:

Column 1, fifth line, "Hoffmann" should read -- Hofmann --.

Column 1, eighth line, insert
   -- [30]    Foreign Application Priority Data
       December 3, 1970    Germany . . . P 20 59 484.7 --.

Column 1, line 48, "dinvyl" should read -- divinyl --.

Column 2, line 14, insert -- C. -- after "100°".

Signed and sealed this 29th day of October 1974.

(SEAL)
Attest:

McCOY M. GIBSON JR.                 C. MARSHALL DANN
Attesting Officer                   Commissioner of Patents